United States Patent
Stanforth (10) Patent No.: US 6,873,839 B2
(45) Date of Patent: Mar. 29, 2005

(54) PRIORITIZED-ROUTING FOR AN AD-HOC, PEER-TO-PEER, MOBILE RADIO ACCESS SYSTEM

(75) Inventor: Peter Stanforth, Winter Springs, FL (US)

(73) Assignee: MeshNetworks, Inc., Maitland, FL (US)

(*) Notice: Subject to any disclaimer, the term of this patent is extended or adjusted under 35 U.S.C. 154(b) by 653 days.

(21) Appl. No.: 09/815,164

(22) Filed: Mar. 22, 2001

(65) Prior Publication Data

US 2002/0090949 A1 Jul. 11, 2002

Related U.S. Application Data (60) Provisional application No. 60/248,182, filed on Nov. 13, 2000.

(51) Int. Cl.[7] .................................................. H04B 1/16
(52) U.S. Cl. ..................................................... 455/343.2
(58) Field of Search .......................... 455/343.1, 343.2, 455/436, 440, 11.1, 437, 438, 439, 574, 566, 572, 127; 370/274, 315, 320

(56) References Cited

U.S. PATENT DOCUMENTS

| | | | |
|---|---|---|---|
| 4,494,192 A | 1/1985 | Lew et al. ................... 364/200 |
| 4,617,656 A | 10/1986 | Kobayashi et al. ........... 370/74 |
| 4,736,371 A | 4/1988 | Tejima et al. ................. 370/95 |
| 4,742,357 A | 5/1988 | Rackley ....................... 342/457 |
| 4,747,130 A | 5/1988 | Ho ............................... 379/269 |
| 4,910,521 A | 3/1990 | Mellon ........................ 342/45 |
| 5,034,961 A | 7/1991 | Adams ......................... 375/130 |
| 5,068,916 A | 11/1991 | Harrison et al. .............. 455/39 |
| 5,231,634 A | 7/1993 | Giles et al. .................. 370/95.1 |
| 5,233,604 A | 8/1993 | Ahmadi et al. ............... 370/60 |
| 5,241,542 A | 8/1993 | Natarajan et al. ........... 370/95.3 |
| 5,317,566 A | 5/1994 | Joshi ............................ 370/60 |

(Continued)

FOREIGN PATENT DOCUMENTS

| | | |
|---|---|---|
| CA | 2132180 | 3/1996 |
| EP | 0924890 A2 | 6/1990 |
| EP | 0513841 A2 | 11/1992 |
| EP | 0627827 A2 | 12/1994 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

"Toplogy Control of Multihop Wireless Networks using Transmit Power Adjustment", by Ram Ramanathan and Regina Rosales–Hain; BBN Techn–ologies (Division of GTE), Cambridge, Mass. 1997.

(Continued)

*Primary Examiner*—Lee Nguyen
*Assistant Examiner*—Sandh D Phu
(74) *Attorney, Agent, or Firm*—Gardner Carton & Douglas LLP; Joseph J. Buczynski (57) ABSTRACT

An ad-hoc, peer-to-peer radio access system having a series of remote terminals, where each remote terminal is capable of forming a link, or hop, of the routing of a call made by one of the series of terminals. The status of the battery of each terminal which may potentially form part of the routing path of a call is reported to other terminals, whereby the routing path for a call will be decided also based on the status of the battery-charge of each terminal along the routing path.

30 Claims, 4 Drawing Sheets

U.S. PATENT DOCUMENTS

| | | | |
|---|---|---|---|
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,533,026 A | 7/1996 | Ahmadi et al. | 370/94 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,748,624 A | 5/1998 | Kondo | 370/437 |
| 5,774,876 A | 6/1998 | Wooley et al. | 705/28 |
| 5,781,540 A | 7/1998 | Malcolm et al. | 370/321 |
| 5,787,076 A | 7/1998 | Anderson et al. | 370/294 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,016,311 A | 1/2000 | Gilbert et al. | 370/280 |
| 6,028,853 A | 2/2000 | Haartsen | 370/338 |
| 6,029,074 A | 2/2000 | Irvin | 455/571 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,058,106 A | 5/2000 | Cudak et al. | 370/313 |
| 6,064,626 A | 5/2000 | Stevens | 365/233 |
| 6,067,291 A | 5/2000 | Kamerman et al. | 370/338 |
| 6,067,297 A | 5/2000 | Beach | 370/389 |
| 6,078,566 A | 6/2000 | Kikinis | 370/286 |
| 6,088,337 A | 7/2000 | Eastmond et al. | 370/280 |
| 6,097,704 A | 8/2000 | Jackson et al. | 370/280 |
| 6,104,712 A | 8/2000 | Robert et al. | 370/389 |
| 6,108,316 A | 8/2000 | Agrawal et al. | 370/311 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,222,463 B1 | 4/2001 | Rai | 340/928 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,359,872 B1 | 3/2002 | Mahany et al. | 370/338 |
| 6,377,805 B1 * | 4/2002 | Anvekar et al. | 455/436 |
| 6,522,900 B1 * | 2/2003 | Cho | 455/572 |
| 2001/0053699 A1 | 12/2001 | McCrady et al. | 455/513 |

OTHER PUBLICATIONS

"Reversing the Collision–Avoidance Handshake in Wireless Networks" by J.J. Garcia–Luna–Aceves and Asimmakis Tzamaloukas; Baskin School of Engineering, University of California, Santa Cruz, 1997.

"Self–Organizing, Self–Healing Wireless Networks", by Chip Elliot and Bob Helle; BBN Technologies, Cambrdge, Mass: IEEE, 2000.

"A Performance Comparison of Multi–Hop Wireless Ad Hoc Netwrk Routing Protocols", by Josh Broch, et al., Carnegie Mellon University, Pttsburgh, Pa., Proceedings of the Fourth Annual ACM/IEEE International Conference on Mobile Computing and Networking; 1998.

"USAP:A Unifying Dynamic Distributed Multichannel TDMA Slot Assignment Protocol", by C. David Young, Rockwell International, Richardson,Texas.

"Net Throughput with IEEE 802.11 Wireless LANs", by Ad Kamerman and Guido Aben, Lucent Tech., Nieuwegein,The Netherlands.

"Transmission–Efficient Routing in Wireless Networks Using Link–State Information", by J.J. Garcia–Luna–Aceves, Baskin School of Engineering, University of California, Santa Cruz; 1997.

"The Core–Assisted Mesh Protocol", by J.J. Garcia–Luna–Aceves and Ewerton L. Madruga, Baskin School of Engineering, University of California, Santa Cruz; 1997.

"Optimization of an Adaptive Link Control Protocol for Multimedia Packet Radio Networks", by J.R.McChesney, et al.; ITT Industries Aerospace Comm. Div.; Ft.Wayne,IN ;1997.

"Hierarchically–Organized, Multihop Mobile Wireless Networks for Quality–of–Service Support", by Ram Ramanathan and Martha Steenstrup; BBN Systems and Tech., Cambridge, Mass. 1995.

"Dynamic Multipoint Virtual Circuits for Multimedia Traffic in Multihop Mobile Wireless Networks", by Martha E. Steenstrup; BBN Tech., Cambridge, Mass. 1995.

"Collision–Avoidance Transmission Scheduling for Ad–Hoc Networks", by Zhenyu Tang and J.J. Garcia–Luna–Aceves, University of California Santa Cruz, Calif., 1997.

"Qos Networking with Adaptive Link Control and Tactical Multi–Channel Software Radios", by George Vardakas, et al., Communications Systems Div. of Raytheon Systems Co., San Diego, Calif.; 1997.

"A Review of Current Routing Protocols for Ad–Hoc Mobile Wireless Networks", Royer, et al., Univ. of Calif.

"The Dynamic Source Routing Protocol for Mobile Ad Hoc Networks", IETF MANET Working Group;Josh Broch, et al., 12/98.

"Ad hoc On–Demand Distance Vector Routing draft–ietf–manet–aodv–08.txt", Mobile Ad Hoc Networking Working G roup, Charles E. Perkins, et al., Mar. 2, 2001.

"Optimized Link State Routing Protocol", IETF MANET Working G Group , Philippe Jacquet, et al, Sep. 2, 2001.

"The Dynamic Source Routing for Mobile Ad Hoc Networks", IETF MANET Working Group, David B. Johnson, et al., Mar. 2, 2001.

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28–Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

* cited by examiner

PRIORITIZED-ROUTING FOR AN AD-HOC, PEER-TO-PEER, MOBILE RADIO ACCESS SYSTEM

CROSS-REFERENCE TO RELATED APPLICATIONS

Priority of provision application Ser. No. 60/248,182, on Nov. 13, 2000 is herewith claimed.

BACKGROUND OF THE INVENTION

The present invention is directed to a method of routing radio telephone calls of an ad-hoc, peer-to-peer radio system, and, in particular, to such an ad-hoc, peer-to-peer radio system disclosed in copending application Ser. No. 09/705,588, filed on Nov. 3, 2001, entitled "Methods and Apparatus for Coordinating Channel Access to Shared Parallel Data Channels", which application is incorporated by reference herein in its entirety. The network system having coordinating channel access to shared parallel data channels via a separate reservation channel of copending application Ser. No. 09/705,588 is directed to a network system, such as radio network, where each node, or radio terminal, of the network is capable of serving as a node or hop of a routing path of a call from another, or to another radio terminal. In that system, communication between nodes or radio terminals is achieved using Carrier Sense Multiple Access with Collision Avoidance (CSMA/CA) protocol with the addition of multiple parallel data channels serviced by one reservation channel. By dedicating a separate reservation channel for the multiple parallel data channels, collision-free access by all of the competing nodes or terminals of the service group of the network is greatly reduced. Communications between terminals or nodes is set up by information exchanged on the separate reservation channel, which information includes all of the call set-up information such as data channel desired to be used for transferring voice, video or data, the desired power level of at least initial transmission, messaging such as Request-to-Send (RTS), Clear-to-Send (CTS), Not-Clear-to-Send (NCLS), Acknowledgment (ACK) for indicating reception of the transmitted call, Non-Acknowledgment (NACK) for indicating improper reception of the call, etc. In this system, in order to further ensure fast, adequate and collision-free transmission and reception, besides a primary modem typically provided with the transceiver of each node or terminal, a secondary modem is also provided which is dedicated to the reservation channel when the primary modem of the transceiver is occupied, such as when sending out data on a data channel. This system also provides for collision free transmission and reception between nodes or terminals by transmitting the reservation and data channels in time slots of time frames, with the information as to which time slot is to be used being included in the messaging transmitted by the reservation channel. Such a format not only provides collision-free transmission, but also allows for Quality-of-Service (QoS) for different types of Class-of-Service (CoS), Thus, not only may voice and video be transmitted, besides data, but voice and data transmission may be prioritized, so that when competing calls vie for a data channel, the delay-dependent voice or video transmissions will take precedence. This prioritization is accomplished by assigning prioritized calls for transmission in earlier time slots of a time frame.

The network system disclosed in U.S. application Ser. No. 09/705,588 ensures that every node or terminal of a service set of terminals has the most information regarding all of other terminals of that service set, so that the choice of data channel to be used, any required delay is transmitting the call, information on power level, and the like, are checked and updated by each terminal by a practically continuous monitoring of the reservation channel.

As explained above, the system disclosed in U.S. application Ser. No. 09/705,588 utilizes protocol that provides collision-free channel access, which also emphasizes improving geographic reuse of the frequency spectrum.

In U.S. Pat. No. 5,943,322—Mayer, et al., which patent is incorporated by reference herein, there is disclosed a radio system is for use, in one embodiment, in battlefield conditions. The ad-hoc, peer-to-peer radio system of this patent does not have, nor require, a base station, as conventional cellular systems, personal communications system (PCS), and the like, require; instead, each radio terminal forming part of the ad-hoc, peer-to-peer radio system may alternatively serve as a base station, in addition to being an ordinary link terminal of the radio system, whereby, if one such terminal serving as a base station should for some reason become inoperative, another terminal may take over and serve as the base station.

The ad-hoc, peer-to-peer radio system of U.S. Pat. No. 5,943,322 is based on a transport-mechanism using a time division duplex (TDD) technique in a code division multiple access (CDMA) system. Time Division Duplex (TDD) is a way of maximizing the bits/hz/km2. Such a system not only may be used for providing commercial voice, but is also quite suited to both transmission and reception of data and video services. Time Division Duplex (TDD) systems are typically used for packet data systems as they make much more efficient use of the available bandwidth, in order to deliver a much higher effective data rate to the end user. TDD is typically used in fixed wired solutions or point-to-point wireless systems because it has its own spectrum limitations. TDD systems, however, have not been deployed for voice systems.

In the above-identified provisional application serial No. 60/248,182, there is disclosed an ad-hoc, peer-to-peer radio system for use as a stand-alone system that is also connected to a cellular network and/or landline. The ad-hoc mobile radio networking system thereof is capable of receiving and transmitting voice, data and video calls through any number of different types of telecommunication networks, such as the PSTN, the Internet, and the like, besides the cellular and next-generation cellular networks.

In any ad-hoc, peer-to-peer radio system, a critical consideration is the status and life of the battery of each terminal forming a part of the system. With the arrival of laptop computers, portable digital assistants (PDAs) and high-tech cellular phones, consumers are beginning to request mobile data services in addition to traditional voice services. Such devices are in use much more than traditional cellular phones, and, therefore, deplete their limited-life batteries more quickly. The ad-hoc, peer-to-peer system disclosed in the above-mentioned priority, provisional application serial No. 60/248,182, depletes batteries even more quickly, since each terminal can also serve as a router and relay for other terminals of the system, in order to extend the range or provide alternate routes to destinations. The ability to limit the use of the battery, therefore, is a very important element and consideration of that system.

In commonly-owned U.S. provisional application serial No. 60/246,833, and commonly-owned pending U.S. application Ser. No. 09/815,157, filed on Mar. 22, 2001, entitled "Time Division Protocol for an Ad-Hoc, Peer-to-Peer Radio Network Having Coordinating Channel Access to Shared Parallel Data Channels with Separate Reservation Channel", which applications are incorporated by reference herein, there are disclosed a protocol method and algorithm for ad-hoc network system that is based on least-energy routing of calls from and between network radio terminals. In simple terms, the major component of the routing decision is to choose the route to the destination that uses the least amount of energy over the complete route. The major reason for this is that least-energy routing minimizes the radiated RF energy, in order to reduce interference between terminals. A consequence of this is that it creates the most efficient use of the power supply of the terminals.

There are, also, other components of most conventional routing algorithms for ad-hoc, peer-to-peer radio systems that are generally related to the Quality of Service (QOS). The two major attributes of QoS are: The potential for delay, or latency, and the potential for bit errors (BER) during transmission. However, no present or prior system or algorithm has taken into consideration the impact of the battery life of the terminals, which, as stated above, should be a major and primary consideration for any network that consists of hand-held terminals, and especially for an ad-hoc, peer-to-peer radio system where batteries are used so much more as compared to conventional radio systems such as the cellular network, PCS's, and the like. Since hand-held terminals only have limited battery life in terms of trade off of size and weight, users do all that is possible in order to conserve their batteries, so that there will be sufficient life in them when they wish to use the device. As stated above, ad-hoc networks discharge a battery even more, even when the terminal owner is not using the terminal, since each terminal may also serve as a base station or a router or a link in the routing decision for connecting a call.

The present invention, therefore, is directed to the provision of the consideration of the status of the battery-charge of each terminal forming a part or link of an ad-hoc, peer-to-peer radio system, whereby the routing algorithm and method by which a call from a terminal-source is connected to the terminal-destination or to an exterior, independent radio system and/or PSTN interconnected with the ad-hoc, peer-to-peer radio system in which the present invention is deployed, also takes into consideration the status of the battery of each terminal by which the routing of the outgoing call is to be connected.

SUMMARY OF THE INVENTION

It is, therefore, the primary objective of the present invention to provide an additional criterion to the routing decision of an ad-hoc, peer-to-peer radio system, which additional criterion includes information about the status of the battery-charge of each battery which may possibly serve as a link for call-routing of call over the radio system.

It is another objective of the present invention to provide such a system where the battery of each radio terminal forming a part of the ad-hoc, peer-to-peer radio system continually calculates and transmits to other, like terminals the status of its battery-charge, whereby each terminal is capable of taking into consideration the status of each battery of each terminal of the radio system when selecting the best route for connecting a call.

It is yet another objective of the present invention to provide such a system where the battery-status information calculated and transmitted to other terminals is used in conjunction with least-energy routing of a radio telephone call in order to choose the route to the destination that uses the least amount of energy over the complete route, whereby least-energy routing minimizes the radiated RF energy, in order to reduce interference between terminals, and in order to provide the most efficient use of the battery power supply of the terminals.

According to the present invention, routing algorithms are extended to include information about the battery state of each terminal, such that if a choice of routes is available, one of which includes a low battery terminal, an alternate route will be selected. Multiple levels of battery determination may be used, the number of which may change depending upon different radio protocols and topologies. For example, a terminal that is in a charging cradle, or hooked up to an external power supply, will identify itself as having infinite battery life. A terminal with a fully charged battery will identify itself as having excellent battery life. A terminal with a low battery life will identify itself as having poor battery life, which will indicate that it should only be used for routing emergency data, or in the case of no other available option. Once the battery drops below some configurable threshold, the terminal will identify itself as having no battery life. This will allow the terminal to reserve some battery life for it's own use.

BRIEF DESCRIPTION OF THE DRAWINGS

The invention will be more readily understood with reference to the accompanying drawings, where.

DETAILED DESCRIPTION OF THE INVENTION

Figure 1A:
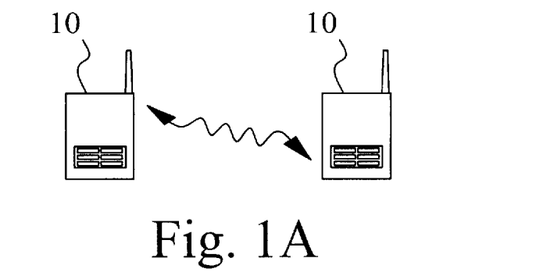
FIGS. 1A and 1B are schematics showing a basic, ad-hoc, peer-to-peer radio system with which the method and algorithm of the present invention may be used.
Figure 1B:
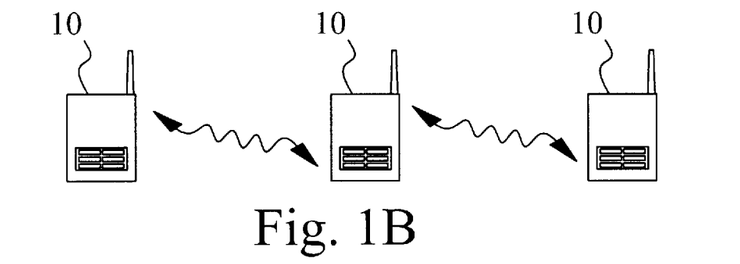
Figure 2:
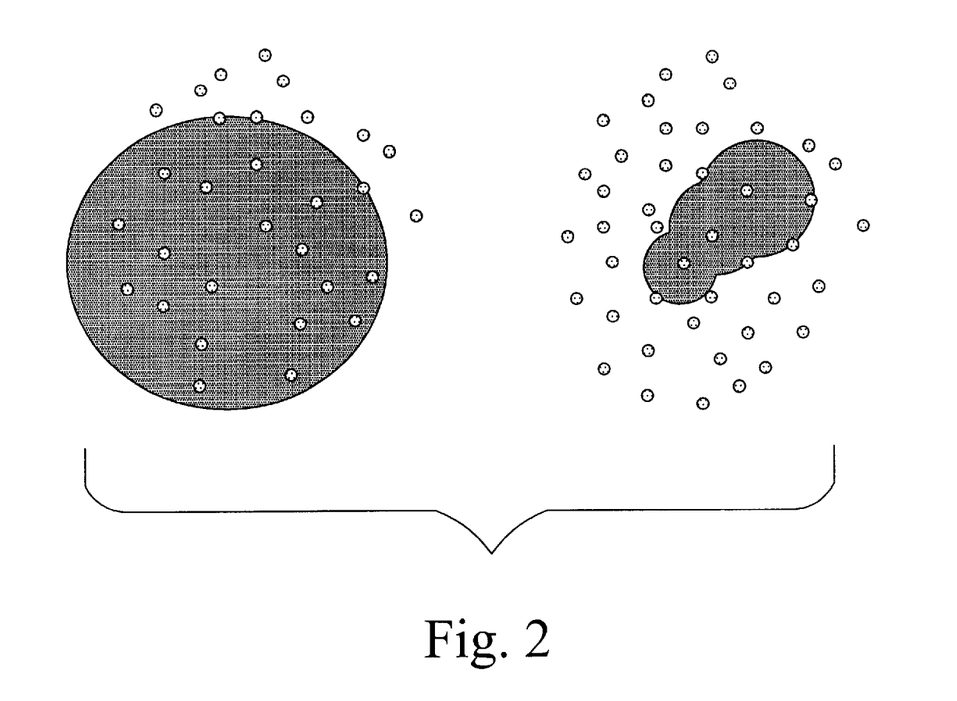
FIG. 2 is a schematic showing an example of least-energy routing with which the system of the present invention is to be used.
Figure 3:
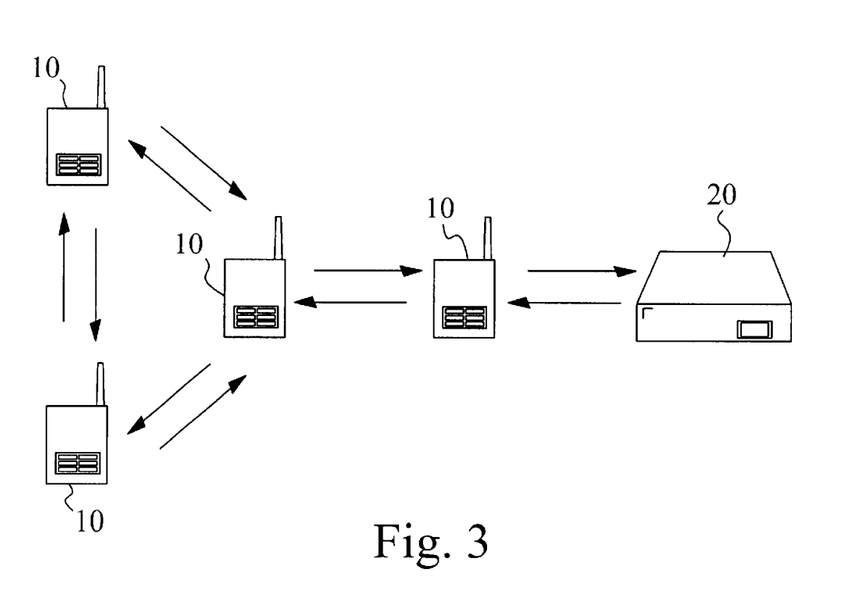
FIG. 3 is a schematic showing the exchange of routing tables of between end-users of an ad-hoc, peer-to-peer radio system with which the battery-status routing method and algorithm of the present invention is used.
Figure 4A:
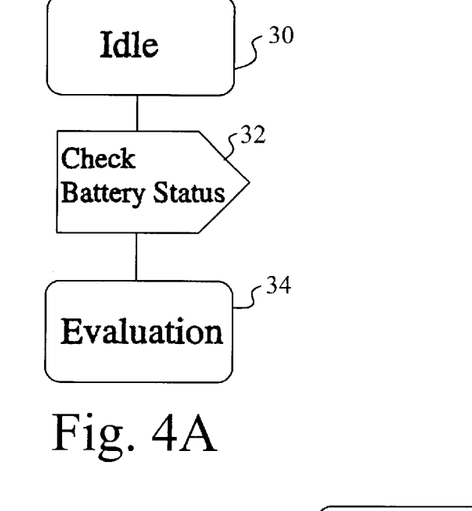
FIGS. 4A and 4B are flow charts showing the subroutine conducted by each terminal of the ad-hoc, peer-to-peer radio system for initiating the checking of the status of its battery, either when it is in its idle state or when it in its stable, alert state.
Figure 4B:
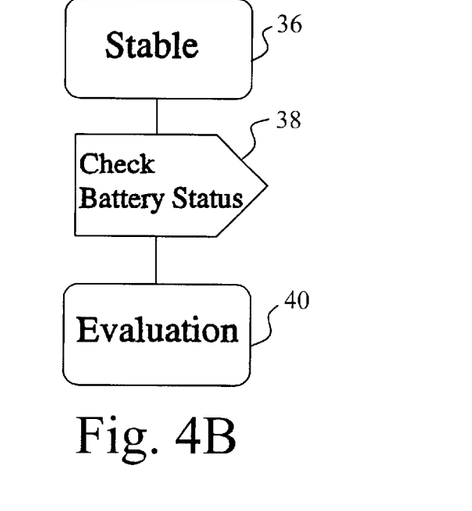

Referring now to the drawings in greater detail, and to FIGS. 1–3 for now, an ad-hoc, peer-to-peer radio system is shown. The ad-hoc radio system consists of a series of radios or terminals 10, which may communicate directly with each one to another, as shown in FIG. 1A, or to other terminals 10 via link-routing where other, intermediate terminals are used, as shown in FIG. 1B. For simplicity, only three such terminals 10 have been shown in FIG. 1B, it being understood that the ad-hoc, peer-to-peer radio system will employ a multitude of such terminals, whereby the routing of a call from one terminal to another will employ a number of other, intermediate terminals. Such an ad-hoc, peer-to-peer radio system is disclosed in the above-mentioned commonly-owned applications serial No. 60/246,833 and Ser. No. 09/815,157, and in priority application serial No. 60/248, 182. The present invention applies to all types of ad-hoc, peer-to-peer radio systems, but has particular relevance to type disclosed in the above-mentioned copending U.S. application Ser. No. 09/705,588.

In the ad-hoc, peer-to-peer radio system disclosed in above-mentioned patent applications, routing of a radio call from a source-terminal to a destination-terminal is achieved by a method and algorithm that calculates the routing path based on least energy; that is, the major component of the routing decision is to choose the route to the destination that uses the least amount of energy over the complete route. The major reason for this is that least-energy routing minimizes the radiated RF energy, in order to reduce interference between terminals. As a result of this, it creates the most efficient use of the power supply of the terminals.

FIG. 2 shows an extreme example of what happens without using least energy routing. The radio source uses a direct route to the destination. This route requires high power, which results in a large number of other radios being interfered with. Therefore, according to least energy routing disclosed in the above-mentioned, commonly-owned U.S. applications serial No. 60/246,833 and Ser. No. 09/815,157. The source radio will choose an alternative routing path with a greater number of radio-hops through intermediate terminals, which will result in reduced interference in the other radio terminals.

There are, also, other components of most conventional routing algorithms for ad-hoc, peer-to-peer radio systems that are generally related to the Quality of Service (QOS). The two major attributes of QoS are: The potential for delay, or latency, and the potential for bit errors (BER) during transmission.

As seen in FIG. 3, the routing of calls is achieved by each terminal storing a routing table if that terminal is to be part a link, or hop, of the routing path. This routing table includes all of the information required by the source-terminal in order to determine and calculate the least-energy path of routing of the call from source-terminal to the destination-terminal. Adjacent or proximate terminals 10 exchange routing tables, as seen in FIG. 3, whereby when a call is to be set up from a source-terminal, each terminal 10 already knows the routing table of its most immediate or adjacent neighbor-terminal, whereby a call may be routed to another destination-terminal, or to a router or gateway 20, for subsequent transmittal of the call to another similar cell of terminals, to a cellular switched network, or to the PSTN, and the like.

In accordance with the present invention, additional information is added to each routing table of each terminal 10, which additional information contains information about the status of the charge of the battery of that terminal, whereby when routing tables are exchanged, the battery status of each terminal is also taken into consideration when determining or calculating the best and most efficient routing path to take for completing a call from a source-terminal to a destination-terminal.

According to the preferred embodiment of the invention, each battery of each terminal 10 may assume one of four status-conditions of 2 bits, or more than four status-conditions may be employed:

| 00 | critical |
| 01 | poor |
| 10 | full |
| 11 | infinite. |

When a terminal 10 is in a charging cradle, or hooked up to an external power supply, it will identify itself as having infinite battery life—code 11. A terminal with a fully charged battery will identify itself as having excellent battery life—code 10. A terminal with a low battery life will identify itself as having poor battery life—code 01, which will indicate that it should only be used for routing emergency data, or in the case of no other available option. Once the battery drops below some configurable threshold, the terminal will identify itself as having no battery life—code 00. This will allow the terminal to reserve some battery life for it's own use.

"Battery Conservation Algorithms"

The components of the system of the present invention described above are independent of the link layer of the ad-hoc transport of that system disclosed in the above-identified commonly-owned patent applications. The present invention adds the capability to the routing layer and call-control layers of the ad-hoc network system, in order to permit the function of battery-conservation to be accomplished.

The basic reasoning behind the algorithm of the present invention is to add a component to the routing decision that includes consideration for the state of the battery. In order for this to work, the routing algorithms are extended to include information about the battery state of the terminal, such that if a choice of routes is available, one of which includes a low battery terminal, the alternate route will be selected.

Figure 5:
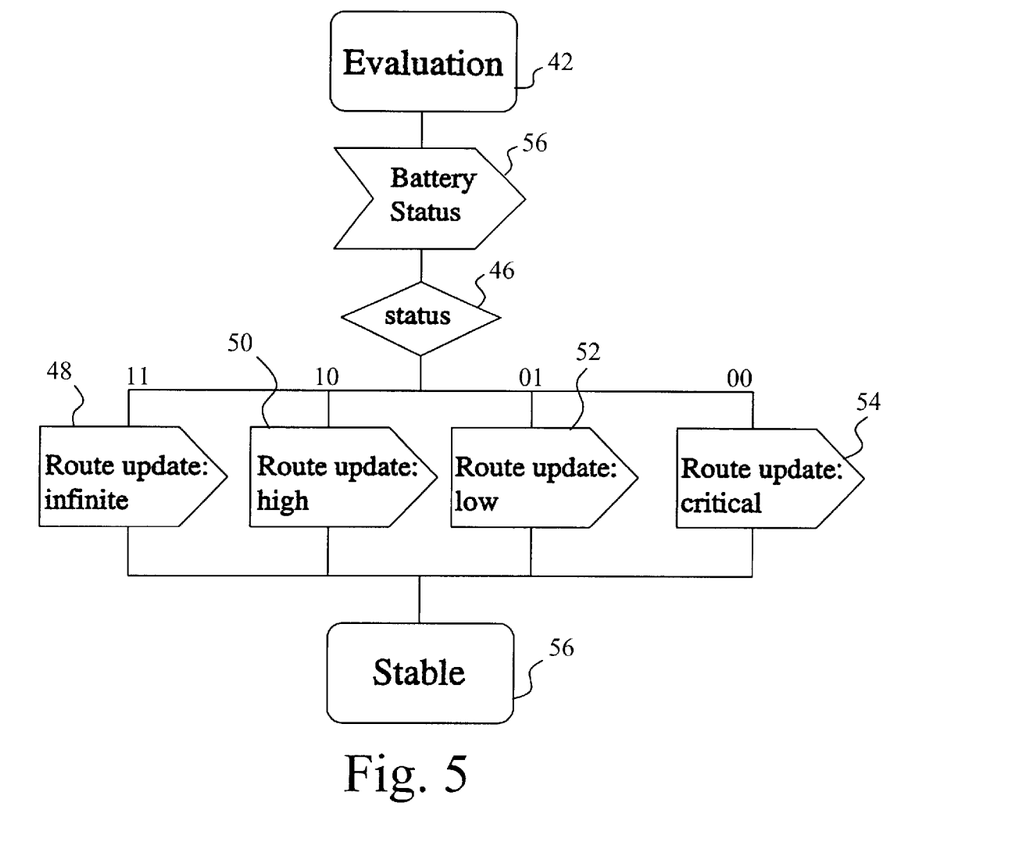
FIG. 5 is a flow chart showing the subroutine by which the status of battery of the terminal is determined for subsequent reporting to other similar terminals in order to serve as a basis for calculating the best route of connection of a radio telephone call.

Referring now to FIGS. 4–7, there are shown the flow charts for the method of adding battery-status information to the routing tables of the terminals 10. Each terminal periodically wakes up in order to check its own battery status (FIG. 4A 0 Blocks 30, 32), after which it will update, if necessary, it routing table (FIG. 5). If the status remains unchanged, then the status of the battery of that terminal will remain unchanged, or stable, as shown in FIG. 4B (block 36), and no change will be made to that terminal's routing table. Again, periodically, the terminal will self-test its battery life (block 38). The battery status is checked using the subroutine "Evaluation" (blocks 34 and 40 in FIGS. 4A and 4B, respectfully).

Referring to FIG. 5, the "Evaluation" subroutine 42 is shown. This subroutine determines whether or not its terminal's routing table needs updating based on the "check-battery status" subroutine of FIGS. 4A and 4B (block 44 of FIG. 5). One the most-recent status has been determined (block 46), it is determined which of the four status-conditions exists: Infinite—block 48(code 11), high—block 50(code 10), low—block 52(code 01), or critical—block 54 (code 00). If the status determined in block 46 is the same as that of the previous results from the "check battery status" subroutine, then the program goes to block 56, indicating that the terminal's battery is stable, indicating that no change of status from the previous determination has occurred, whereby no change is made to the terminal's routing table. However, if there has been a change from the previous status, then the program will update the terminal's routing table to the appropriate code-value. The update need not necessarily be a downgrade; if, since the last status-check of the battery the battery had been recharged, then a status-upgrade to the routing table will ensue. The updated routing table will be transmitted to each adjacent terminal of the ad-hoc, peer-peer-radio system, preferably as part of the configuration data time-frame messaging transmitted and received on the control channel, as disclosed in commonly-owned U.S. application No. 60/246,833 and Ser. No. 09/815, 157, which are incorporated by reference herein. Radio terminals of the ad-hoc, peer-to-peer system thereof routinely exchange routing tables with their neighbors, either after some configurable time delay, which is typically several seconds, or when they note a change in the environment or view of the neighbors. The battery condition of the terminal then becomes a new and critical factor or parameter of the routing update message, which, according to the present invention, is incorporated into the updated routing table messaging.

Figure 6:
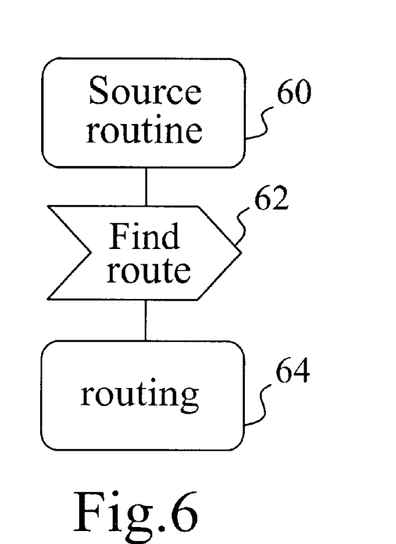
FIG. 6 is a flow chart showing the subroutine performed at the terminal-source that is initiating an outgoing radio telephone call, in order to actuate the subroutine for determining the best routing of its outgoing call.
Figure 7:
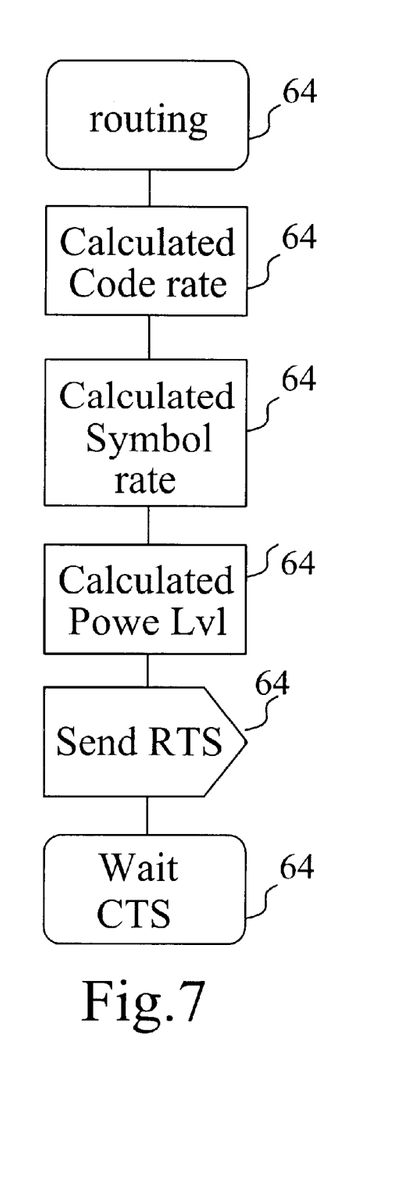
FIG. 7 is a flow chart showing the routing table messaging subroutine for establishing the outgoing radio telephone call which may be based not only on least energy routing, but also on the status of the battery of each terminal-link potentially forming a part of the route for connecting the outgoing radio telephone call.

Referring to FIGS. 6 and 7, there is shown the flow charts for a source terminal 60 determining (block 62) the optimal route 64 for the type of call it is sending. In FIG. 7, the routing table messaging subroutine includes calculated values for the Code Rate (block 66), the Symbol Rate (block 68), the Power Level (70), and the RTS (Request to Send) message to another node-terminal or gateway(block 70), after which is waits for the CTS (Clear to Send) message (block 72) from the other terminal or gateway.

"Terminal Battery Determination Algorithm"

The following are algorithms for performing the battery-status check and update of a terminal's battery, and its consideration in the routing decision made by a source-terminal.

/*This algorithm is used by a hand-held terminal to define the battery status and will report to other terminals in the routing data exchange:

```
*/
IF power_source = external
    THEN        Battery := infinite
    ELSE IF battery_level = full
        THEN    Battery := excellent
        ELSE IF battery_level >= config_param—battery
            THEN Battery := poor
            ELSE Battery := critical
```

/* config_param_battery is a system parameter that is provisioned over the air or the terminal interface that defines the threshold for eliminating the terminal from the routing options. This should range from 25% to 50% of the available battery power.
*/

Terminals exchange routing table information on a regular basis via the time-frame messaging on the control channel of the ad-hoc, peer-to-peer radio system. These messages include information on the terminals that the initiating device can see and the parameters that it understands about those terminals. The critical components are the quality of the link between the initiating device and all those terminals, the data rates that it could maintain on those links, and the congestion level of the terminal. To this information is added the present invention's indication of the battery level of the initiating terminal.

The routing update message includes a new field battery_condition: battery_condition (2 bits)

|    |          |
|----|----------|
| 02 | critical |
| 03 | poor     |
| 11 | full     |
| 11 | infinite |

As previously mentioned, there are several schemes that can be employed by the source of a message to determine the optimal route to the destination. The following algorithm is based on a minimum energy routing algorithm.

```
source-routing (message_ptr,msg-length,destination,
    msg-type)
/* source based routing including link adaptation algo-
    rithm
*/
opt_route(destination, msg_type)
/* determine optimal route to destination this will return
    the best available route based on Class Of Service
    (COS) from msg_type and other network parameters
    including link quality and battery life. The returned
    information will be used to calculate the data rate and
    power level
```

```
*/
calc_symbol_rate (sym_rate)
calc_code_rate (code_rate)
calc_pwr_level (pwr_level)
send_msg(RTS,msg_length,destination,sym_rate,code_rate,pwr_level)
/* send RTS to first router and await CTS to send the data packet
```

The Symbol Rate is a standard calculation of the number of RF chips to be used to define a symbol or bit of data in the transmission.

The Code Rate is conventional, and is a function of the direct sequence spread spectrum, and, specifically, the spreading code PN to be used for the transmission.

Power Level is defined in 1 dB steps between −27 and +28 dBm, where 28dBm is approximately equivalent to the maximum power allowed under FCC Rules for the ISN band; for other RF spectrums, the range may vary.

opt_route (destination, msg_type)

RTS refers to Request-To-Send message; CTS refers to Clear-To-Send message; msg refers to the message sent from each terminal. The "code" is one of the four 2-digit codes of the battery status described above.

/*This algorithm determines the best route to the destination based on the COS in the message type.

The following example illustrates the decision process:

Route1 term1->term4
Low latency, worst battery level=excellent, BER=high
Route 2 term1->term2->term4
High latency, worst battery level=good, BER=low
Route 3 term1->term2->term3->term4
High latency, worst battery level poor, BER=low
Route 4 term1->term5->term6->term4
Low latency, worst battery level=poor, BER=low BER is Bit-Error-Rate; latency is delay.

In the case of a voice call that has a COS that can tolerate a high BER but not high latency, it would choose route 1 over route 4 because of the battery and because it cannot tolerate high latency.

In the case of a data call that has a COS that can tolerate high latency but not high BER, it will choose route 2 over route 3 or 4 because of the battery.

In a second embodiment, instead of utilizing four battery levels in the algorithm of the invention, there are seven battery levels used and reported.

Battery—A value from 0–7 designating the following battery conditions:

0. IAP;
1. Wireless Router;
2. Subscriber Device with non-battery power;
3. Subscriber Device with nearly full battery (>80%);
4. Subscriber Device with battery level (>50%);
5. Subscriber Device with battery level low (>20%);
6. Subscriber Device (or Wireless Router) with minimal battery (>0%);
7. Subscriber Device: Don't Use Ever. This prevention should be capable of being chosen by the network manager remotely.

The following is an example of the routing table messaging used in the present invention incorporating seven such battery status indications.

1 Ad-Hoc Routing Header

| Mod ID (8 bits) | Msg ID (8 bits) | Version (8 bits) | TOS (8 bits) |
|---|---|---|---|
| Lateral (1 bits) | Sequence Num (8) | | Carrier ID (16 bits) |
| TTL (hops) (7 bits) | | | |
| Source Address (48 bits) | | | |
| | | Destination Address (48 bits) | |
| Payload (X bits) | | | |

This is the standard header for all AHRL inter-node messages. The Payload field may be an IP message to be transmitted, or any other AHRL message going over-the-air. Each field is described as:

Mod ID: the module generating the message
Msg ID: the unique message type identified assigned and known on a module-by-module basis.
Version: The software version being used by the generating terminal: 4 bits for major rev, and 4 bits for minor rev.
TOS: the standard internet TOS field which effects QoS. Inter AHR messages shall set the TOS based on a lookup table of values TBD which is based on the payload being sent.
LAT/TTL: The TTL (time to live) field is the estimated hop count based on the number of hops indicated in the routing table. One is subtracted from this count at each relaying node. If the TTL reaches zero, then the message is destroyed. The Lateral bit is used to indicate that this message has been laterally forwarded, and the hop count is not decremented.
Carrier ID: This value is used to distinguish one Arachnet system from another.
Source Address: The 48-bit hardware address of the originating terminal of the message.
Destination Address: The 48-bit hardware address of the destination terminal.
Payload: Any block of data that is to be transmitted over-the-air.

2. Routing Advertisement Message (RA)
2.1 Routing Advertisement Header

| Node Addr (48-bits) | | |
|---|---|---|
| | Seq. Num (8-bits) | Num Entries (8-bits) |
| Metrics (32-bits) | | |

Note Addr—The 48-bit address of the sender of the Routing Advertisement.
Seq Num—A sequence number which is incremented each time a node sends a Routing Advertisement.
Num Entries—The number of entries in the Routing Advertisement.
Metrics—The metrics associated with a sending node. See section 3.

2.2 Routing Advertisement Entry

| Node Address (48-bits) | |
|---|---|
| | Next Hop Address (48-bits) |
| Metrics (32-bits) | |
| Repeat up to MAX_RA_NODES... | |

This is the Routing Advertisement message, which is defined in the Routing module spect. It is contained within the RT to TC IMM.

Node Address—The 48-bit address of the destination being reported by the sender of the Routing Advertisement.
Next Hop Address—The 48-bit address of the node that is being used as the next hop from the sender of the Routing Advertisement towards the destination being reported.
Metrics—The metrics associated with the destination being reported. See section 3.

3 Routing Metrics

| Energy (16-bits) | | | | | |
|---|---|---|---|---|---|
| Hops-3 | Congestion-3 | Mobility-1 | Ra Heard-1 | Battery-3 | pad-5 |

The metrics sent in the routing advertisement are used to determine a Link Resistance value that becomes the cost associated with the route to the destination. The metrics are associated with the best path that the sender has currently chose to reach that destination. The following are descriptions of each metric:

Energy—A value that is calculated with the formula:

$$\text{Cost} = 10\ dB + (\text{Power Level}) + 10 * \log 10(\text{Max Data Rate}/\text{DataRate})$$

EXAMPLE 1
Power Level=−10 dbm, Data Rate=8 Mbps $$\text{Cost} = 10 + (-10) + 10 * \log 10(8/8) = 10 + (-10) + 0$$

EXAMPLE 2
Power Level=+30 dbm, Data Rate=500 kbps.

$$\text{Cost} = 10 + (+30) + 10 * \log 10(8/0.5) = 40 + 10 * 1.2 = 52$$

The range for this value is 0–52.

Hops—The number of hops to the sender of the RA to the destination.
Congestion—The average quantized level of congestion from the sender of the RA to the destination (range 0–7).
Mobility—A bit designating whether or not the destination node is currently moving.
Ra Heard—A bit designating whether or not the sender of the RA has recently received an RA from the destination being reported.
Battery—A value from 0–7 designating the following battery conditions:
 0. IAP
 1. Wireless Router
 2. Subscriber Device with non-battery power
 3. Subscriber Device with nearly full battery (>80%)
 4. Subscriber Device with battery level (>50%)
 5. Subscriber Device with battery level low (>20%)
 6. Subscriber Device (or Wireless Router) with minimal battery (>0%)
 7. Subscriber Device: Don't Use Ever. This prevention should be capable of being chosen by the network manager remotely There are 5 additional bits remaining for future metrics expansion. Also, there are additional bits in the energy field that may be used.

While a specific embodiment of the invention has been shown and described, it is to be understood that numerous changes and modifications may be made therein without departing from the scope and spirit of the invention.

What is claimed is:

1. In an ad-hoc, peer-to-peer radio system comprising a series of terminals where each said terminal is capable of making at least one of an outgoing call or receiving an incoming call, each said terminal comprising a battery, each said terminal further comprising computer means and memory means for storing program software means therein, said memory means comprising software means for generating a routing table for use by other terminals in determining the routing path of a call to be made or received thereby, and where said at least one of an outgoing call or an incoming call is routed to its destination by routing said call along a route utilizing at least some of said terminals of said series of terminals as links, the improvement comprising:

said software means of said memory means of each said terminal comprises means for checking the status of the respective said battery in order to include said battery-status in said routing table, whereby each terminal may calculate the most optimal routing path of terminals based on battery status.

2. The ad-hoc, peer-to-peer radio system according to claim 1, wherein said means for checking the status of the respective said battery of said software means comprises a plurality of status indicators; said plurality of status indicators comprising at least two of: infinite, full, poor and critical; said infinite status indicator indicating a terminal whose power source is external, said full status indicator indicating an approximately fully charged battery, said poor status indicator indicating a substantially discharged battery, and said critical status indicator indicating a battery charge below a predetermined critical value.

3. The ad-hoc, peer-to-peer radio system according to claim 2, wherein said means for checking the status of the respective said battery comprises at least all four of said status indicators.

4. The ad-hoc, peer-to-peer radio system according to claim 1, wherein said software means of said memory means further comprises means for determining and reporting in said routing table information on least-energy routing so that the least amount of energy over a selected route is chosen for completing a call, whereby the minimizing of radiated RF energy is achieved in order to reduce interference between terminals.

5. The ad-hoc, peer-to-peer radio system according to claim 2, wherein software means of said memory means comprises updating means for updating the battery status indicator of said respective routing table thereof based on the most recent status report determined by said means for checking the status of the respective said battery.

6. The ad-hoc, peer-to-peer radio system according to claim 5, wherein said software means of said memory means further comprises message-generating means for generating a routing table, said routing table comprising time-frame based messaging, said time-frame based messaging having said battery-status indicator as a section thereof.

7. The ad-hoc, peer-to-peer radio system according to claim 6, wherein time-frame based messaging is based on time division technique in a code division multiple access (CDMA) system.

8. The ad-hoc, peer-to-peer radio system according to claim 6, wherein message-generating means for generating a routing table of each said terminal also comprises information on least-energy routing so that the least amount of energy over a selected route is chosen for completing a call, whereby the minimizing of radiated RF energy is achieved in order to reduce interference between terminals, said time-frame based messaging also having a section for reporting least-energy routing of a call.

9. The ad-hoc, peer-to-peer radio system according to claim 6, wherein said message-generating means for generating a routing table further comprises means for generating information on the class of service (COS) being transmitted, said means for generating information on the type of message being sent comprising the capability of reporting at least one of the following types of COS information: voice type information, data type information, and video type information, whereby routing of a call is based also on the said type of COS information being transmitted.

10. In an ad-hoc, peer-to-peer radio system comprising a series of terminals where each said terminal is capable of making at least one of an outgoing call or receiving an incoming call, each said terminal comprising a battery, each said terminal further comprising computer means and memory means for storing program software means therein, the method comprising:

(a) generating at each said terminal a routing table for use by other said terminals in determining the routing path of a call to be made or received thereby;

(b) routing a call to its destination using said routing tables by selecting a path utilizing at least some of said terminals of said series of terminals as links;

(c) said step (a) comprising including in each said routing table informational data about the status of the battery of the respective said terminal;

(d) said step (b) comprising selecting a path for said routing at least partially based on said informational data about the status of the batteries of potential terminal-links.

11. The method according to claim 10, wherein before said step (c):

(e) checking the status of the battery charge of the respective said terminal by said software means of said memory means; and (f) inserting said status from said step (e) into the respective said routing table for said step (c).

12. The method according to claim 11, wherein said step (e) comprises selecting said status to report to said routing table from one of a series of possible status indicator states.

13. The method according to claim 12, wherein said step (e) comprises selecting one from more than three possible status indicator states.

14. The method according to claim 10, wherein said step (a) comprises including in each said routing table informational data about least-energy routing so that the least amount of energy over a selected route is chosen for completing a call, whereby the minimizing of radiated RF energy is achieved in order to reduce interference between terminals.

15. The method according to claim 14, wherein said step (a) further comprises generating informational data in each said respective routing table regarding the class of service (COS) being transmitted, said step of generating informational data on the type of message being sent comprising the reporting at least two of the following types of COS information: voice type information, data type information, and video type information, whereby routing of a call is based also on the said type of COS information being transmitted.

16. In a radio terminal used in an ad-hoc, peer-to-peer radio system, which radio system comprising a series of radio terminals each capable of making at least one of an outgoing call or receiving an incoming call; said radio terminal comprising a battery, computer means, and memory means for storing program software means therein, said memory means comprising software means for generating a routing table for use by other terminals in determining the routing path of a call along a route utilizing at least some of said radio terminals of said series of terminals as links, the improvement comprising:

said software means of said memory means of said radio terminal comprising means for checking the status of said battery in order to include said battery-status in said routing table, whereby each said radio terminal of said radio system may calculate the most optimal routing path of terminals based on battery status.

17. The radio terminal according to claim 16, wherein said means for checking the status of the respective said battery of said software means comprises means for checking for a plurality of status indicators; said plurality of status indicators comprising at least four said status indicators of: infinite, full, poor and critical; said infinite status indicator indicating a terminal whose power source is external, said full status indicator indicating an approximately fully charged battery, said poor status indicator indicating a substantially discharged battery, and said critical status indicator indicating a battery charge below a predetermined critical value.

18. The radio terminal according to claim 17, wherein said means for checking the status of the respective said battery comprises means for checking for at least all four of said status indicators.

19. The radio terminal according to claim 16, wherein said software means of said memory means further comprises means for determining and reporting in said routing table information on least-energy routing so that the least amount of energy over a selected route is chosen for completing a call, whereby the minimizing of radiated RF energy is achieved in order to reduce interference between terminals.

20. The radio terminal according to claim 16, wherein software means of said memory means comprises updating means for updating the battery status indicator of said respective routing table thereof based on the most recent status report determined by said means for checking the status of the respective said battery.

21. The radio terminal according to claim 19, wherein said software means of said memory means further comprises message-generating means for generating said routing table, said routing table comprising time-frame based messaging, said time-frame based messaging having said battery-status indicator as a section thereof.

22. The radio terminal according to claim 21, wherein time-frame based messaging is based on time division duplex (TDD) technique in a code division multiple access (CDMA) system.

23. The radio terminal according to claim 21, wherein message-generating means for generating a routing table of each said terminal also comprises information on least-energy routing so that the least amount of energy over a selected route is chosen for completing a call, whereby the minimizing of radiated RF energy is achieved in order to reduce interference between terminals, said time-frame based messaging also having a section for reporting least-energy routing of a call.

24. The radio terminal according to claim 21, wherein said message-generating means for generating a routing table further comprises means for generating information on the class of service (COS) being transmitted, said means for generating information on the type of message being sent comprising the capability of reporting at least two of the following types of COS information: voice type information, data type information, and video type information, whereby routing of a call is based also on the said type of COS information being transmitted.

25. A method of routing a call in an ad-hoc, peer-to-peer radio system, which radio system comprising a series of radio terminals each capable of making at least one of an outgoing call or receiving an incoming call, and where each said terminal is capable of being a link to a call made from a source-terminal, said method comprising:

(a) transmitting one of voice or data over a routing path of said terminals;

(b) determining the class of service (COS) of the call;

(c) said step(b) comprising determining which of said voice or data is being transmitted by the call;

(d) selecting a routing path based on said step (b);

(e) said step (c) comprising basing its decision of a routing path based on latency, bit error rate, and battery level of each potential terminal of a selected said routing path.

26. The method of routing a call in an ad-hoc, peer-to-peer radio system according to claim 25, wherein when said step (b) indicates voice transmission and said step (d) comprises choosing a routing path of terminals having relatively high BER and relatively low latency.

27. The method of routing a call in an ad-hoc, peer-to-peer radio system according to claim 25, wherein when said step (b) indicates data transmission, and said step (d) comprises choosing a routing path of terminals having relatively low BER and relatively high latency.

28. The ad-hoc, peer-to-peer radio system according to claim 1, wherein said checking means checks the status of the respective said battery when its respective said terminal is acting as a router for multiple terminals in the ad-hoc, peer-to-peer radio system.

29. The method according to claim 10, wherein said information data pertains to the status of the battery of the respective said terminal when the respective said terminal is acting as a router for multiple terminals in the ad-hoc, peer-to-peer radio system.

30. The radio terminal according to claim 16, wherein said checking means checks the status of said battery when said radio terminal is acting as a router for multiple radio terminals in the ad-hoc, peer-to-peer radio system.

* * * * *

UNITED STATES PATENT AND TRADEMARK OFFICE
CERTIFICATE OF CORRECTION

PATENT NO. : 6,873,839 B2
DATED : March 29, 2005
INVENTOR(S) : Peter Stanforth

It is certified that error appears in the above-identified patent and that said Letters Patent is hereby corrected as shown below:

The title page should be deleted and substitute the attached title page as shown on the attached page.

Delete drawing sheets 1-4, and substitute the drawing sheets, consisting of Figs. 1A-7 as shown on the attached pages.

Signed and Sealed this

Seventh Day of February, 2006

JON W. DUDAS
*Director of the United States Patent and Trademark Office*

(12) United States Patent
Stanforth (10) Patent No.: US 6,873,839 B2
(45) Date of Patent: Mar. 29, 2005

(54) PRIORITIZED-ROUTING FOR AN AD-HOC, PEER-TO-PEER, MOBILE RADIO ACCESS SYSTEM

(75) Inventor: Peter Stanforth, Winter Springs, FL (US)

(73) Assignee: MeshNetworks, Inc., Maitland, FL (US)

(*) Notice: Subject to any disclaimer, the term of this patent is extended or adjusted under 35 U.S.C. 154(b) by 653 days.

(21) Appl. No.: 09/815,164

(22) Filed: Mar. 22, 2001

(65) Prior Publication Data

US 2002/0090949 A1 Jul. 11, 2002

Related U.S. Application Data

(60) Provisional application No. 60/248,182, filed on Nov. 13, 2000.

(51) Int. Cl.[7] .................................................. H04B 1/16
(52) U.S. Cl. .................................................. 455/343.2
(58) Field of Search .......................... 455/343.1, 343.2, 455/436, 440, 11.1, 437, 438, 439, 574, 566, 572, 127; 370/274, 315, 320

(56) References Cited

U.S. PATENT DOCUMENTS

| | | | |
|---|---|---|---|
| 4,494,192 A | 1/1985 | Lew et al. | 364/200 |
| 4,617,656 A | 10/1986 | Kobayashi et al. | 370/74 |
| 4,736,371 A | 4/1988 | Tejima et al. | 370/95 |
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |

(Continued)

FOREIGN PATENT DOCUMENTS

| | | |
|---|---|---|
| CA | 2132180 | 3/1996 |
| EP | 0924890 A2 | 6/1990 |
| EP | 0513841 A2 | 11/1992 |
| EP | 0627827 A2 | 12/1994 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

"Toplogy Control of Multihop Wireless Networks using Transmit Power Adjustment", by Ram Ramanathan and Regina Rosales–Hain; BBN Techn–ologies (Division of GTE), Cambridge, Mass. 1997.

(Continued)

Primary Examiner—Lee Nguyen
Assistant Examiner—Sandh D Phu
(74) Attorney, Agent, or Firm—Gardner Carton & Douglas LLP; Joseph J. Buczynski (57) ABSTRACT

An ad-hoc, peer-to-peer radio access system having a series of remote terminals, where each remote terminal is capable of forming a link, or hop, of the routing of a call made by one of the series of terminals. The status of the battery of each terminal which may potentially form part of the routing path of a call is reported to other terminals, whereby the routing path for a call will be decided also based on the status of the battery-charge of each terminal along the routing path.

30 Claims, 4 Drawing Sheets